(12) United States Patent
Okada

(10) Patent No.: US 6,381,675 B1
(45) Date of Patent: *Apr. 30, 2002

(54) SWITCHING MECHANISM AND DISK ARRAY APPARATUS HAVING THE SWITCHING MECHANISM

(75) Inventor: Akihiko Okada, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/256,290

(22) Filed: Feb. 24, 1999

(30) Foreign Application Priority Data

Feb. 27, 1998 (JP) .............................................. 10-047384

(51) Int. Cl.⁷ ............................................... G06F 12/00
(52) U.S. Cl. ...................... 711/114; 711/154; 710/131; 714/6; 714/7
(58) Field of Search .......................... 710/131; 714/607; 711/154, 114

(56) References Cited

U.S. PATENT DOCUMENTS 5,285,451 A * 2/1994 Henson et al. ................. 714/6
5,867,640 A * 2/1999 Aguilar et al. ................. 714/6

FOREIGN PATENT DOCUMENTS

| JP | 4-268621 | 9/1992 |
| JP | 6-48033 | 6/1994 |
| JP | 8-202497 | 8/1996 |
| JP | 8-328758 | 12/1996 |
| JP | 9-258906 | 10/1997 |
| JP | 9-305324 | 11/1997 |

OTHER PUBLICATIONS

Japanese Office Action w/partial translation dated Nov. 6, 2001.

* cited by examiner

Primary Examiner—Do Hyun Yoo
Assistant Examiner—Mehdi Namazi
(74) Attorney, Agent, or Firm—McGinn & Gibb, PLLC

(57) ABSTRACT

The present invention enables to obtain a data transfer at a high rate, at a reasonable cost, and with a high reliability.

The disk array system according to the present invention includes: a plurality of arrayed disk apparatuses 8a to 8f for writing/reading a data; a plurality of array controllers 2a, 2b for controlling writing/reading a data to/from the disk apparatuses 8a to 8f according to an instruction from a host computer; and a switching mechanism 1 connected to each of the disk apparatuses 8a to 8f, for establishing an exclusive connection between the array controllers 2a, 2b and the disk apparatuses 8a to 8f. When one of the array controller 2a, 2b has acquired from the other array controllers 2a, 2b a control authority over all or one of the disk apparatuses 8a to 8f according to an instruction from a host computer, the array controller having the control authority controls the switching mechanism 1 to establish a connection between the array controller and the disk apparatuses. Means for this connection is also provided in the system.

18 Claims, 9 Drawing Sheets

SWITCHING MECHANISM AND DISK ARRAY APPARATUS HAVING THE SWITCHING MECHANISM

BACKGROUND OF THE INVENTION

1. Field of the Invention

The present invention relates to a disk array apparatus and in particular, to a disk array apparatus including a disk apparatus of specification allowing only a single initiator. The present invention also relates to a switch circuit for selectively connecting such a disk apparatus to a disk controller.

2. Description of the Related Art

Conventionally, a disk array system using a plurality of magnetic disks has been used so as to increase the data transfer speed and to enable to restore a data even if a trouble has occurred. In a conventional disk array apparatus, the interface of the magnetic disk apparatuses is usually of SCSI specification. In a magnetic disk apparatus of SCSI specification can recognize a plurality of initiators through the arbitration function. Accordingly, in order to assure a reliability of the entire disk array apparatus, a plurality of array controllers are connected. In this case, each of the magnetic disk apparatuses can recognize the respective array controllers.

However, in case of the SCSI specification, the apparatus itself has various functions and the magnetic disk apparatus becomes complicated, which in turn makes the entire disk array system complicated. Furthermore, a magnetic disk of SCSI specification can recognize a plurality of initiators. This requires a selection processing between the initiator and a target. This selection processing lowers the bus efficiency and the entire data transfer speed.

Moreover, the SCSI specification is based on a general-purpose design concept and the apparatus itself has various functions, resulting in a high price. Furthermore, as shown in FIG. 10, if a data transfer is increased by independent bus control without sharing a bus, SCSI controllers 55a to 55j for the magnetic disk apparatuses should be mounted on a control package 50a and 50b. This also results in increasing the cost of entire disk array apparatus.

On the other hand, in case of a magnetic disk apparatus of the ATA specification in which the magnetic disk apparatus itself is not expensive, the magnetic disk apparatus itself allows only a single initiator and it is impossible to use a plurality of array controllers as the initiator. Accordingly, it is impossible to assure a sufficient reliability of the disk array apparatus as a whole.

SUMMARY OF THE INVENTION

It is therefore an object of the present invention to provide a disk array apparatus enabling a high data transfer rate at a reasonable cost with a high reliability as well as a switch circuit used for the disk array apparatus.

The present invention provides a disk array apparatus that can enhance the aforementioned reliability even if a disk apparatus allows only a single initiator, and a switch circuit used for the disk array apparatus.

The switching mechanism according to the present invention comprises: a plurality of array controller connectors connected to a first signal line for a data transfer to/from a plurality of array controllers; a plurality of disk apparatus connectors connected to a second signal line for a data transfer to/from a disk apparatus in which writing/reading of the data is controlled by the array controllers; and a plurality of connection lines for connections between the plurality of array controller connectors and the disk apparatus connectors; a plurality of switch circuits provided on the connection lines for one-to-one connection between the plurality of array controller connectors and the disk apparatus connectors.

The switching apparatus further comprises an array controller switching circuit provided in the switch circuits and upon reception a path switching signal from the array controllers, establishing a connection between an array controller corresponding to the path switching signal and the disk apparatus connectors.

It is preferable that each of the plurality of switch circuits be connected independently from one another to the disk apparatuses.

The switching mechanism may further comprise a control line connector for connecting a control line for transmitting the path switching signal, to the switch circuits.

The switch circuits may provide a first operation state for connecting a first one of the array controllers to the disk apparatuses and a second operation state for connecting a second one of the array controllers to the disk apparatuses.

The switch circuits may provide a first operation state for connecting a first one of the array controllers to the disk apparatuses, a second operation state for connecting a second one of the array controllers to the disk apparatuses, and a third operation state for not connecting any one of the first and second array controllers to the disk apparatuses.

The disk array apparatus according to the present invention comprises: a plurality of switching mechanisms as has been described above, each having an array controller connector; a plurality of disk apparatuses which are connected to the switch mechanisms on one-to-one principle; and a plurality of array controllers connected to the array controller connectors and in response to an instruction from a host computer, writing or reading a data to/from the disk apparatuses.

The array controller which has acquired the control authority outputs the path switching signal to each of the plurality of switching mechanisms.

According to another aspect of the invention, the array controller which has acquired the control authority outputs signals identical to the path switching signal at once to the plurality of switching mechanisms.

BRIEF DESCRIPTION OF THE DRAWINGS

FIG. 2A shows the switch circuit in a first operation state,

FIG. 2B shows the switch circuit in a second operation state, and

FIG. 2C shows the switch circuit in a third operation state.

DESCRIPTION OF THE PREFERRED EMBODIMENTS

Description will now be directed to embodiments of the present invention with reference to the attached drawings.

Figure 1:
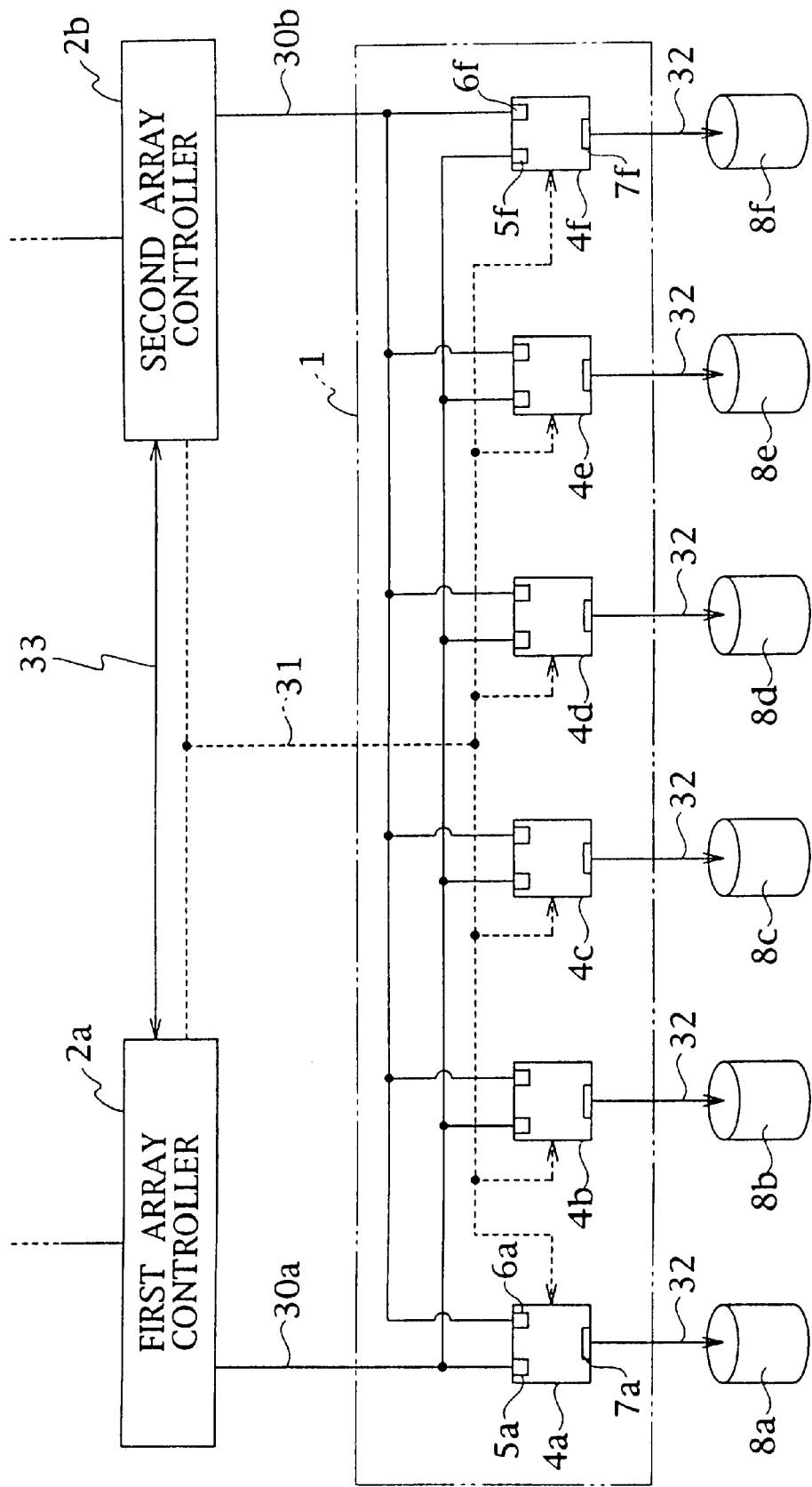
FIG. 1 is a block diagram showing a configuration of a disk array apparatus according to an embodiment of the present invention.

FIG. 1 is a block diagrams showing a configuration of the disk array system according to the present invention. As shown in FIG. 1, the disk array system includes: a plurality of array controllers 2a, 2b for controlling a data writing/reading to/from a disk apparatus according to an instruction from a host computer; a plurality of disk apparatuses 8a to 8f for writing/reading a data according to control from the array controllers 2a, 2b; and a switching mechanism connected to each of the plurality of disk apparatuses 8a to 8f for exclusively switching between the disk apparatuses and the plurality of array controllers 2a, 2b.

When one of the array controllers 2a and 2b has obtained from the other array controller 2a or 2b a control authority of all or one of the disk apparatuses 8a to 8f according to an instruction from the host computer which includes OS, driversoft and applicationsoft, the array controller which has obtained the control authority controls a switching mechanism 1 corresponding to the disk apparatus so as to connect the array controller to the disk apparatus. Each of the array controllers 2a and 2b has means for performing the aforementioned.

That is, an array controller which has acquired the disk apparatus control authority controls the switching mechanism 1 to connect the array controller to the disk apparatus. Accordingly, even when a disk apparatus has an interface that cannot recognize a plurality of initiators, it is possible to install a plurality of array controllers. Consequently, for example, even when constituting a disk array using magnetic disk apparatuses of Advanced Technology Attachment (ATA) specification which cannot recognize a plurality of initiators, it is possible to employ a plurality of array controllers depending on the purpose. Thus, the present embodiment can be applied to a plurality of disk apparatuses 8, for example, of the ATA specification allowing only one initiator.

Moreover, as shown in FIG. 1, the switching mechanism includes switch devices 4a to 4f, each connected to the corresponding disk apparatuses. Each of the switch devices 4a to 4f has at least three connectors. That is, each of the switch devices 4a to 4f has: an array control connector 5a to 5f, 6a to 6f connected to first signal lines 30a, 30b for data transmission/reception to/from the array controllers 2a, 2b; and a corresponding disk apparatus connectors 7a to 7f for connection to a second signal line for data transmission/reception to/from the disk apparatuses 8a to 8f.

Figure 2:
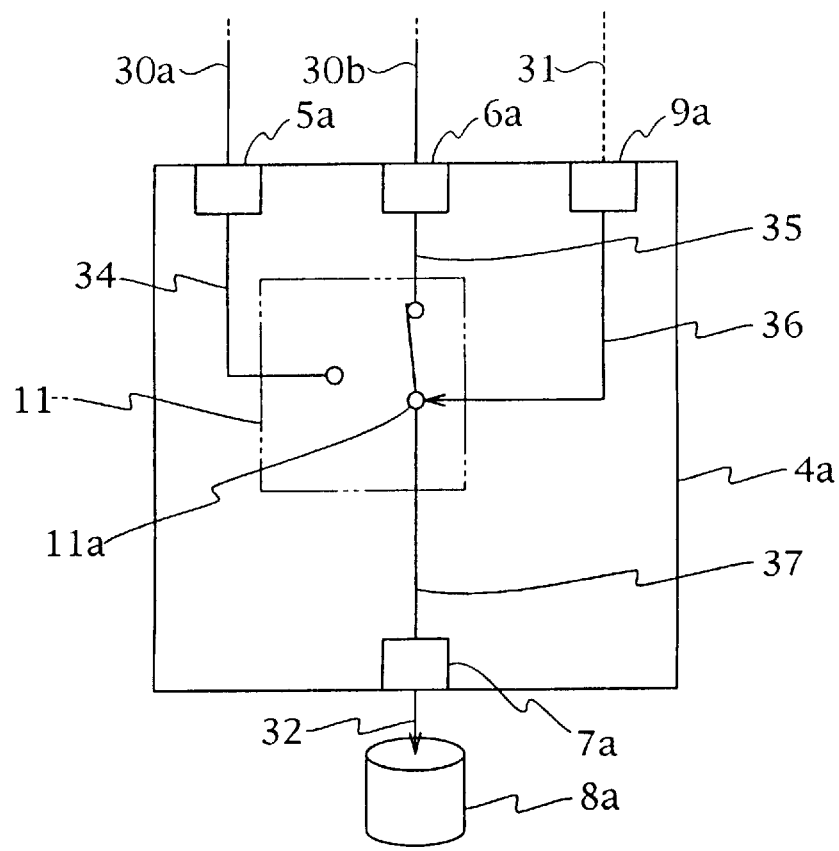
FIG. 2 shows a detailed configuration of a switch circuit used in the disk array apparatus, FIG. 1.
Figure 2:
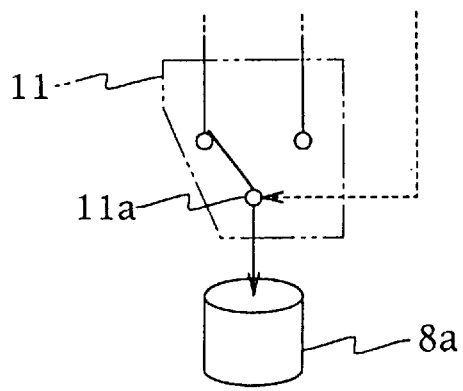
Figure 2:
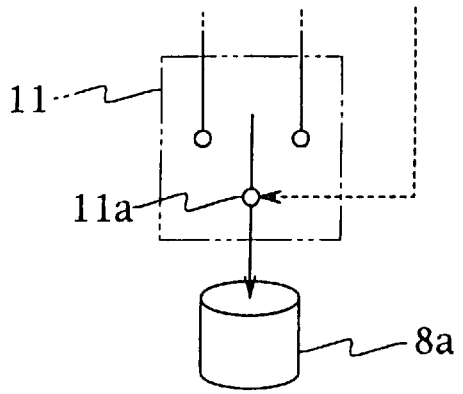

Referring to FIG. 2, the switch device 4a has connection lines 34, 35, 37 and a switch 11. The connection lines 34, 35, 37 serve for connection to the array controller connectors 2a, 2b and to the disk apparatus connector 5a, 6a with overlap. The switch 11 serves for one-to-one connection without overlap between the plurality of array controller connectors 2a, 2b provided on the connection lines 34, 35, 37 and the disk apparatus connector 7a. When the switch 11 receives a path switching signal from the array controller, the switch 11 connects the array controller connector 5a to the disk apparatus connector 7a (array controller switch means 11a). This switch 11, according to the path switching signal, forcibly switches between the array controller connectors 5a and 6a to be connected to the disk apparatus connector 7a. Accordingly, from the viewpoint of the disk apparatus 8a, it looks like that a data transfer is performed with a single initiator.

Moreover, in the example of FIG. 2, the switch device 4a has a control line connector 9a for connection to a control line 31 for transmitting the path switching signal. Accordingly, the path switching signal supplied by the array controllers 2a, 2b is supplied to the switch 11 via the control line 36 connected the control line 31 and the control line connector 9a. Furthermore, this path switching signal may also be supplied to the switch 11 via a normal data bus 30a, 30b.

The switch state may be in connection to one of the array controllers 2a and 2b or in not connection to either of them. That is, the switch may be in a first operation state (FIG. 2A) for connecting the array controller 2a to the disk apparatus 8a or in a second operation state (FIG. 2B) for connecting the array controller 2b to the disk apparatus 8a. Moreover, according to another embodiment, the switch 11 may have a third operation state for connecting none of the array controllers 2a and 2b to the disk apparatus 8a. If one of the array controllers is connected to the disk apparatus even when a path switching signal for this third operation state is supplied, it is decided that the switch 11 is abnormal.

The path switching signal may be any signal that can be used for controlling the switching mechanism 1. For example, suppose the path switching signal is a signal for generating a pulse for each switching from one operation state to another. Moreover, as shown in FIG. 1, when two array controllers are used and there are two switching destinations with two operation states, it is possible to output high and low signals depending on the switching destination. In this case, switching mechanism 1 serves as a selector for exclusively supplying a signal from one of the array controllers according to the high or low path switching signal. Furthermore, it is possible to utilize a command for establishing a connection between the array controller 2 and the disk apparatus 8 without using a particular control line. That is, the array controller which has acquired the disk apparatus control authority by occupying the bus issues a command to the disk apparatus. This command can be used as a path switching signal for controlling the switch circuit.

The switching mechanism 1 can have various configurations according to the configurations of the path switching signal. FIG. 2 shows a functional example, which can actually be realized by a logical circuit. That is, it is possible to use a switching IC and a relay circuit for switching to a destination corresponding to a pulse input.

Referring to again FIG. 1, each of the switch devices 4a to 4f is connected to a disk apparatus independently from one another. Accordingly, in the example of FIG. 1, if the switch device 4a has failed, only the switch device 4a need to be replaced.

Figure 3:
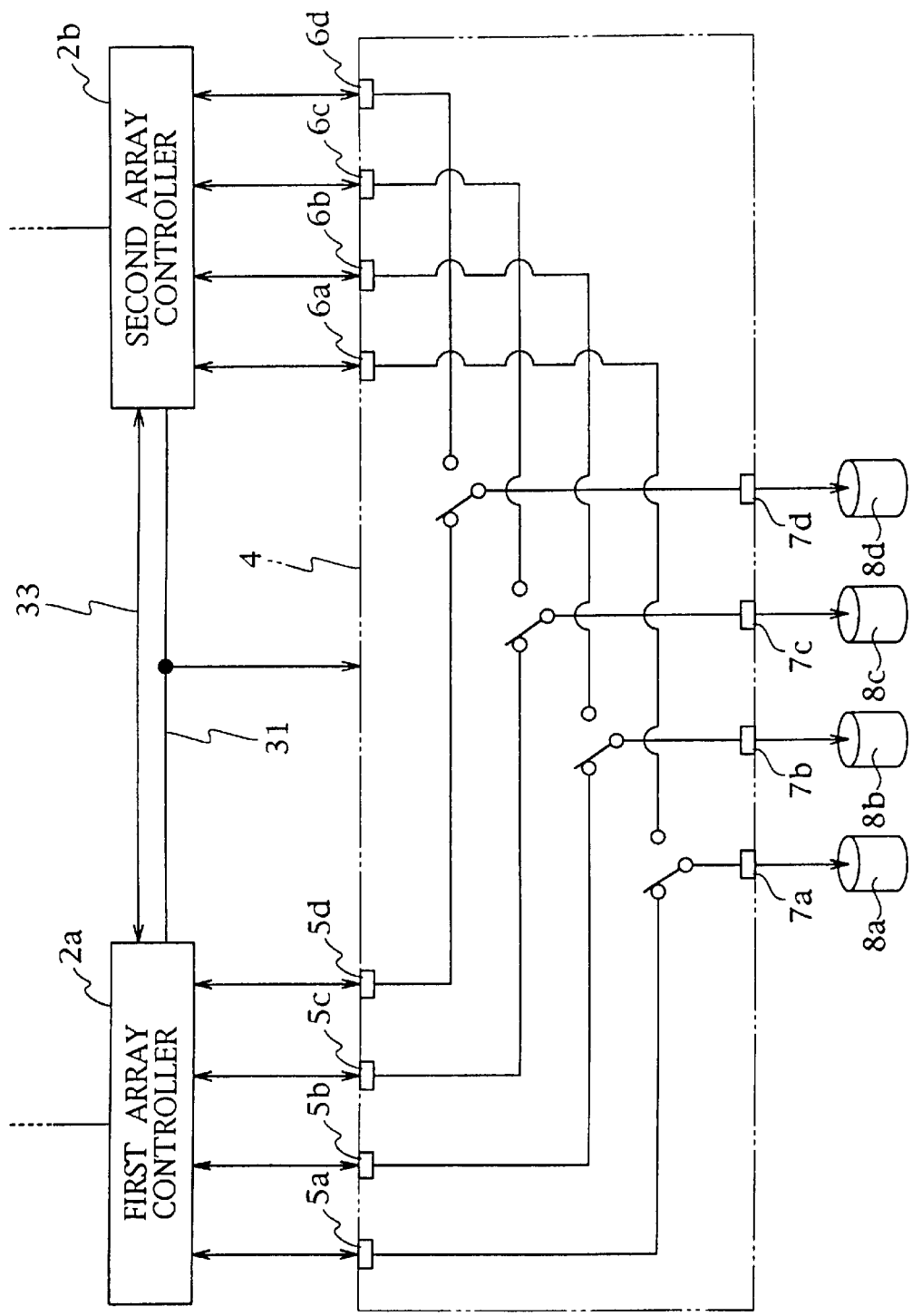
FIG. 3 is a block diagram showing the switching mechanism of FIG. 1 when integrated into a simplified configuration.

Referring to FIG. 3, a single switch circuit 4 is used as the switching mechanism 1. When such a switch circuit is used, it is possible to reduce the space required for installing the switch circuit as well as to reduce the production cost of the switch circuit.

Figure 4:
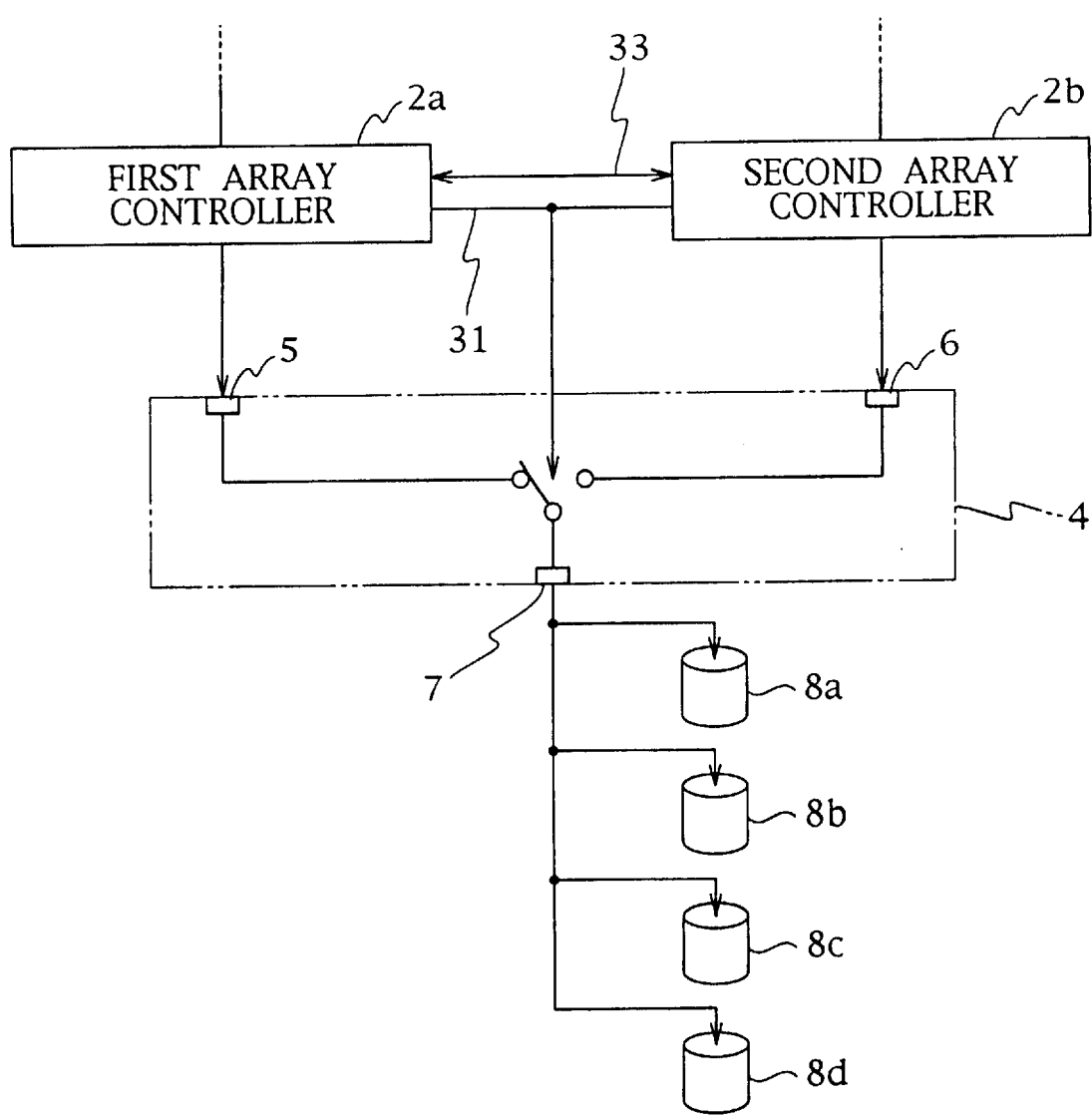
FIG. 4 is a block diagram showing a disk array apparatus using a single switch circuit.

Referring to FIG. 4, the switch circuit 4 is further simplified. In this example, when connecting disk apparatuses as a daisy chain, it is sufficient to provide one switching mechanism 1. In this example of FIG. 4, when one of the array controllers has failed, control can be passed to the other array controller, enabling to improve reliability of the disk array system.

In the examples of FIG. 1 and FIG. 3, it is possible to select to the array controller 2a or 2b for each of the discs. Accordingly, the path switching signal from the array controller is supplied separately to each of the switch circuits. In this case, a data transfer currently performed to a disk apparatus 8 is interrupted if the other array controller 2 outputs a path switching signal to the switch circuit. To cope with this, in the examples of FIG. 1 and FIG. 3, assignment of the control authority of the disk apparatus 8 between the array controllers is performed through a communication line 33. The array controller 2 which has acquired the disk control authority of a disk apparatus outputs a path switching signal to a switch circuit corresponding to the disk apparatus. When the switch circuit control is performed after the assignment of the control authority, it is possible to prevent a danger of erroneous switching of a switch circuit as well as enable to easily switch between the switch circuits.

FIG. 1 shows an example of the control line 31 connected to each of the switch devices involved in the switching mechanism 1. In FIG. 3, the control line 31 is omitted. Moreover, if there is no simultaneous access by the two array controllers to different disk apparatuses 8, the array controllers 2 may output an identical path switching signal to the plurality of switch devices at once. In this case, the control line 31 may be only one as shown in FIG. 3.

Figure 5:
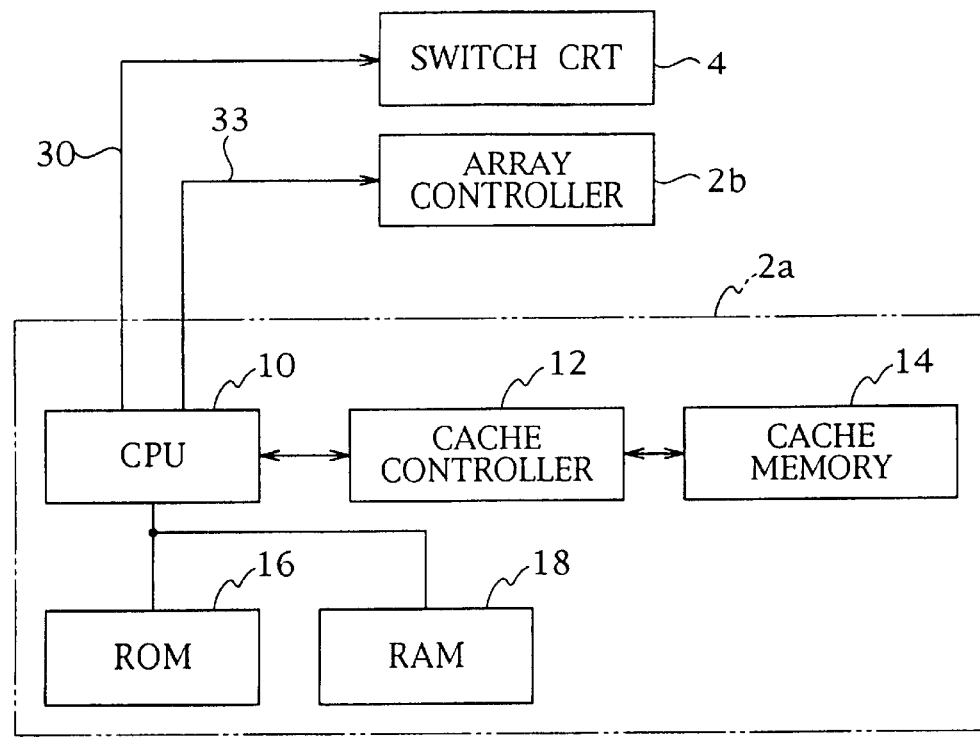
FIG. 5 is a block diagram showing a detailed configuration of the array controller of FIG. 1.
Figure 10:
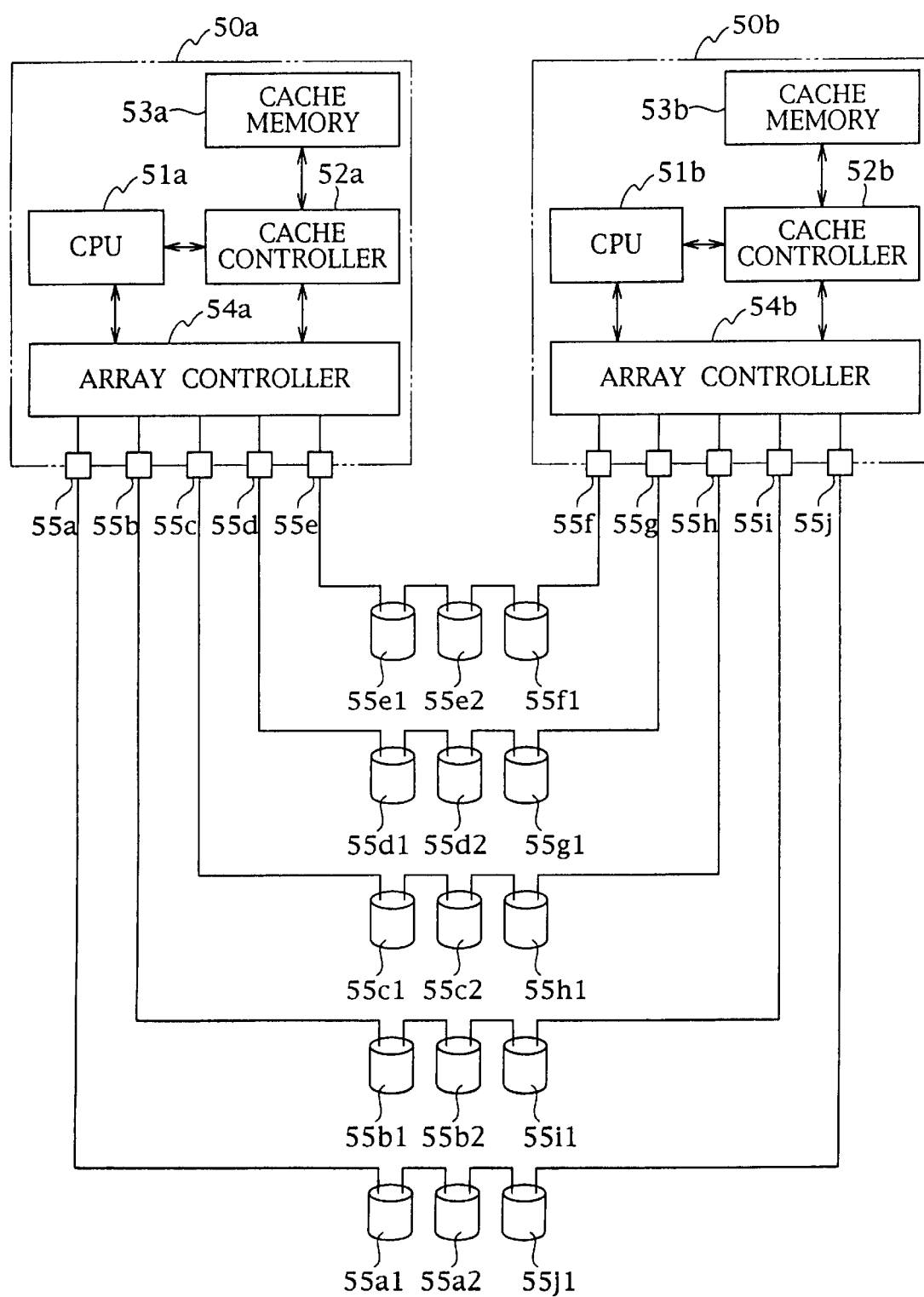
FIG. 10 is a block diagram showing a configuration of a conventional disk array system.

Referring to FIG. 5, the array controller 2a includes: a CPU 10 for executing a program; a cache memory 14 for temporarily storing a data transferred between the array controller and the disk apparatus; and a cache controller 12 for controlling the cache memory 14. Moreover, as shown in FIG. 10, the array controller may be a control package for performing a multiplication of specific data.

Furthermore, the array controller 2a is connected to the CPU 10 and includes a ROM 16 for storing a program and a data, and a RAM 18 serving as a work area for execution of the program of the CPU 10. The cache memory 14 may be an area allocated as a part of the RAM area.

Figure 6:
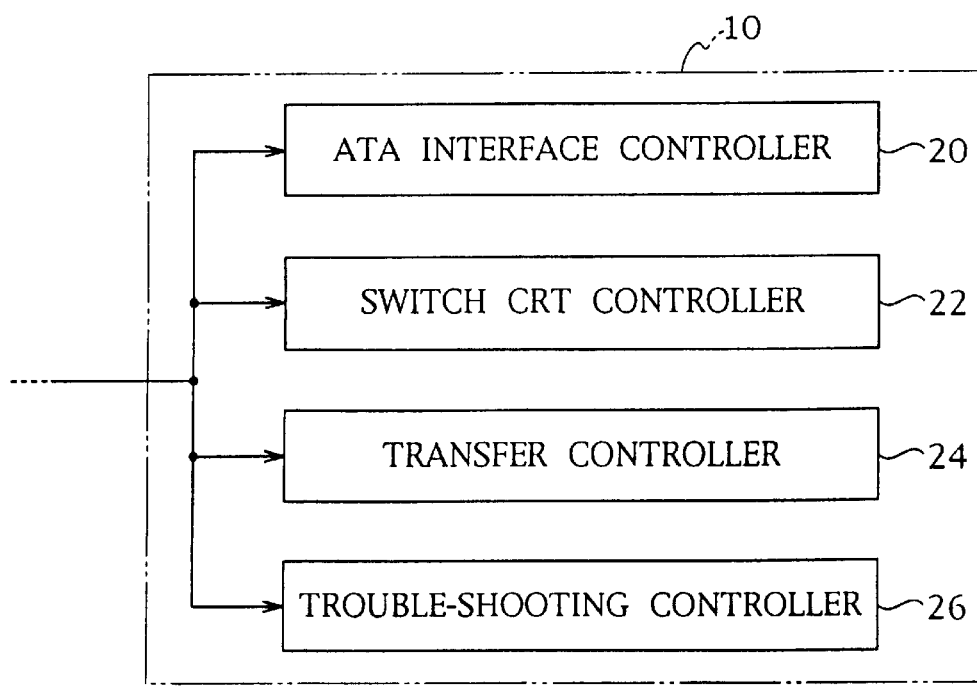
FIG. 6 is a block diagram showing a configuration of each controller realized by the CPU of FIG. 5.

Referring to FIG. 6, the CPU 10 has functions as an ATA interface controller 20, a switch circuit controller 22, a transfer controller 24, and a trouble decision controller 26. In this example, the ROM 16 contains following programs stored in advance: a program for controlling a disk apparatus according to the ATA interface; a program for producing a path switching signal to the switch circuit; a program for performing assignment of the control authority for data transfer and an actual data transfer; and a program for deciding whether a disk apparatus and a switch circuit have an error.

By providing the ATA interface controller 20 and the switch circuit controller 22, it is possible to control a disk apparatus of ATA interface even when accessed through an interface of the SCSI specification from a host computer of the array controller 2. Accordingly, without modifying the configuration of the host computer side, it is possible to apply the disk apparatus according to the present embodiment which is cheap in cost. Moreover, the ATA interface controller 20 and the switch circuit controller 22 may be not a CPU executing a program but a logical circuit. The same applies to the other controllers.

Referring to FIG. 1 again, the plurality of array controllers have the communication line 33 for connection between the array controllers. The array controllers have means for performing a disk control authority acquisition processing using the communication line. This control authority acquisition processing is performed by the CPU 10 shown in FIG. 5.

Figure 7:
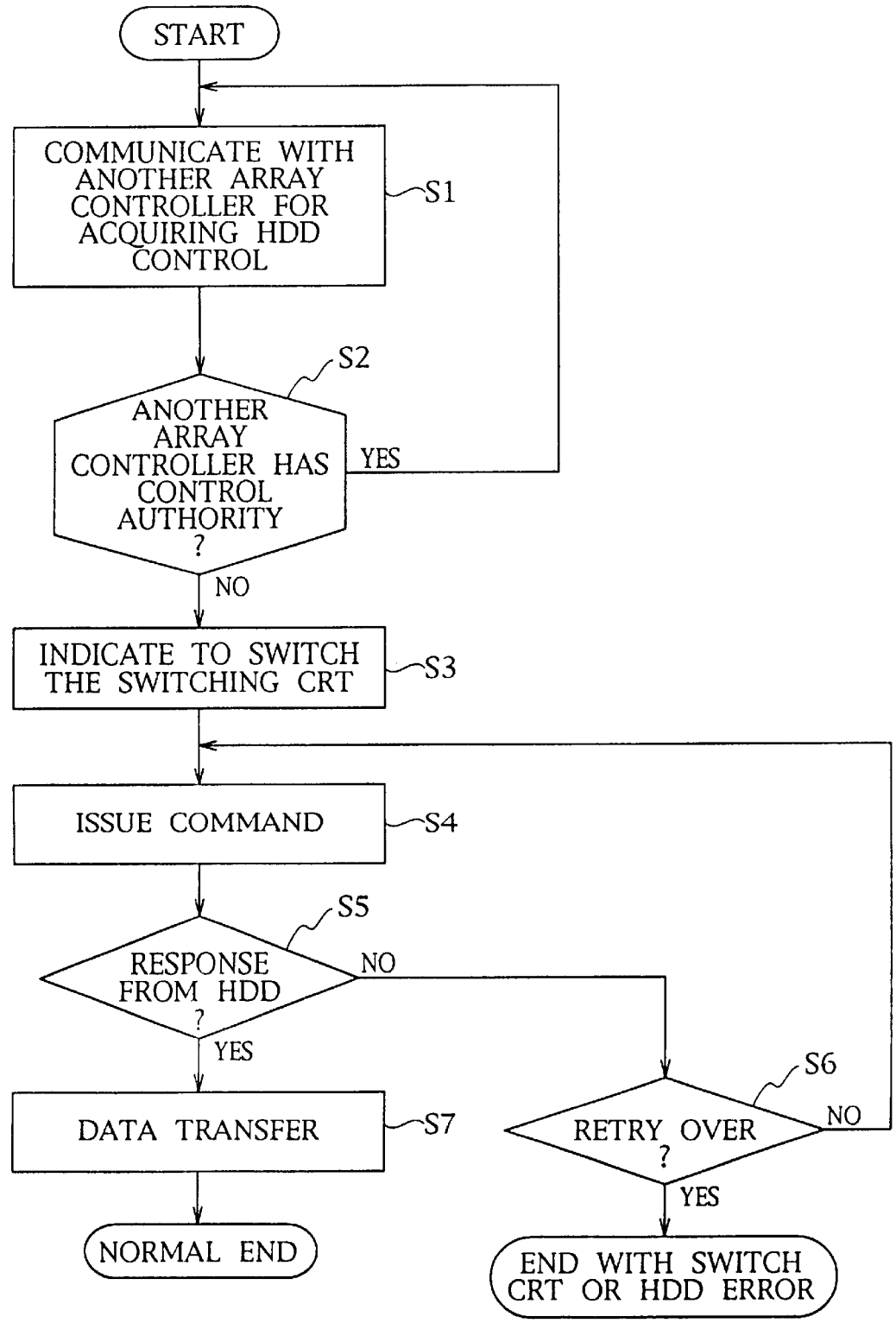
FIG. 7 is a flowchart showing a control example by the configuration of FIG. 1 and FIG. 5.

Referring to FIG. 7, the array controller operates as follows. Upon reception of an access instruction from a host computer, the array controller uses the communication line 3 to communicate with the other array controller so as to acquire a control authority of a physical disk apparatus (such as a hard disk drive) to be accessed (step S1). If the other array controller already has the control authority (YES in step S2), the array controller communicates again with the other controller about the control authority for the same instruction or can perform another instruction, changing the instruction order.

On the other hand, if the other array controller has no control authority (NO in step S2), a path switching signal is supplied to a switch circuit 4 corresponding to the physical disk apparatus (step S3). After waiting for the switching delay, a command of the ATA specification is issued to the disk apparatus (step S4). If the disk apparatus 8 has made a response to this command (step S5), a data transfer is performed (step S7). If no response is obtained from the disk apparatus 8, retry is repeated a plurality of times or for a predetermined period of time, and it is checked whether the retry has failed (step S6).

Unless the retry has failed, the command is again issued. On the other hand, if no response is obtained for the retry, the switch circuit terminates the processing, deciding that the disk apparatus has an error.

Figure 8:
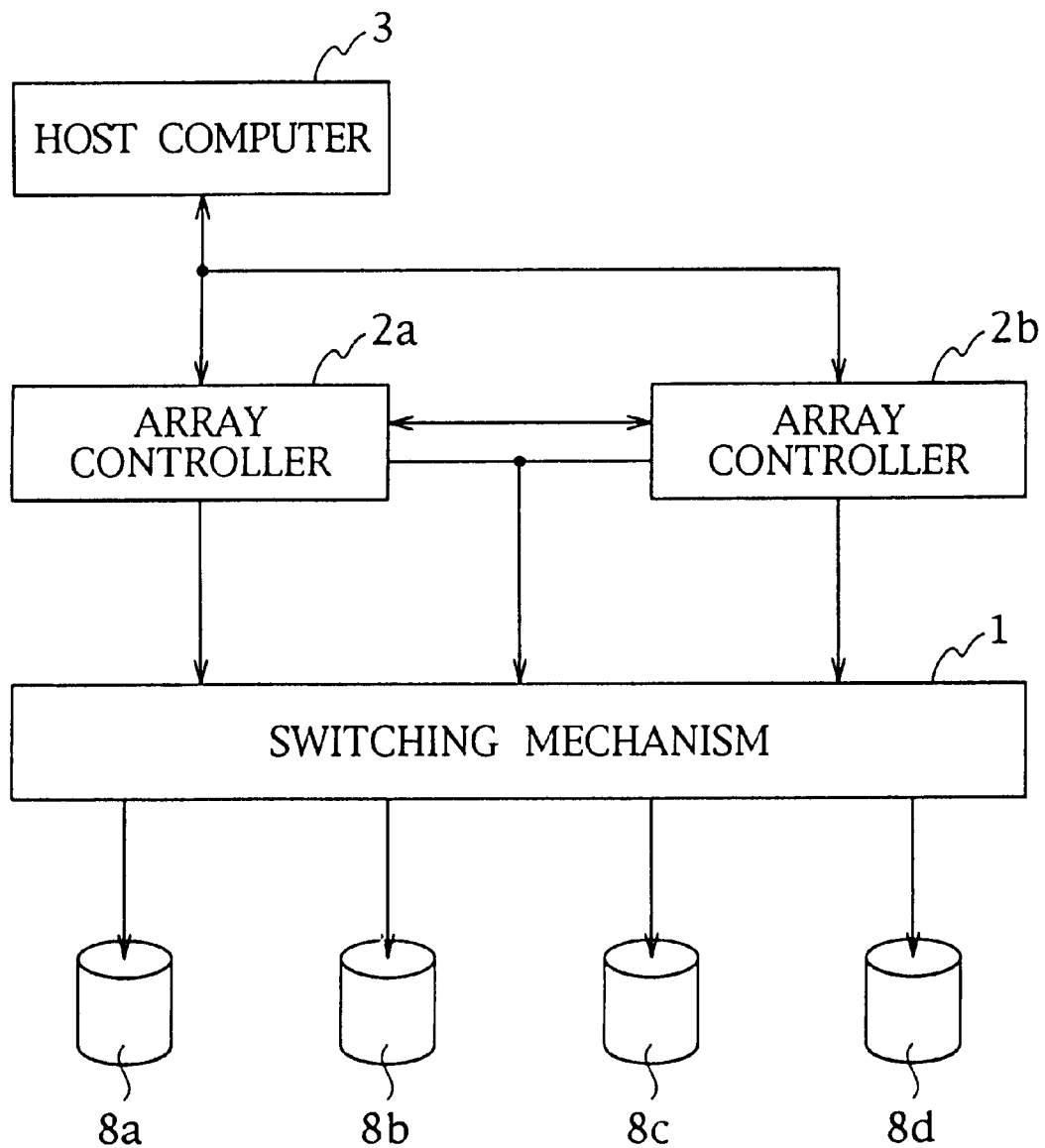
FIG. 8 is a block diagram showing a configuration of a computer system using a single host computer.

FIG. 8 shows a computer system having the aforementioned switching mechanism. The computer system includes: a host computer 3, a plurality of array controllers 2 for controlling a data writing/reading to/from disk apparatuses 8 according to an instruction from the host computer 3; a plurality of disk apparatuses 8 for a data writing/reading according to control from the array controllers; a switching mechanism 1 connected to each of the plurality of disk apparatuses 8 and serves to exclusively switch the plurality of array controllers to the disk apparatuses.

Referring to FIG. 8, one host computer is connected to two array controllers. When controlling the disk array system (disk sub system) using this one host computer, the host computer has two host bus adapters (such as SCSI boards), which are connected to the respective array controllers 2. In this case, even if an error occurs in one of the host bus adapters, the other host bus adapter can control the disk sub system. Alternatively, it is possible to use a single host bus adapter for a daisy chain connection of the plurality of array controllers 2.

In such a computer system, when an array controller has failed, a processing is performed as follows for example. If an error has occurred in one 2a of the plurality of array controllers 2, the host computer passes control to the other array controller 2b. Furthermore, when control is passed to the array controller 2b, the array controller 2b acquires a control authority of the plurality of disk apparatuses and controls the switching mechanism to connect the array controller 2b to the plurality of disk apparatuses. Accordingly, even when using a disk apparatus that can recognize only one initiator, it is possible to provide a plurality of array controllers thereby to improve the reliability of the entire computer system.

Figure 9:
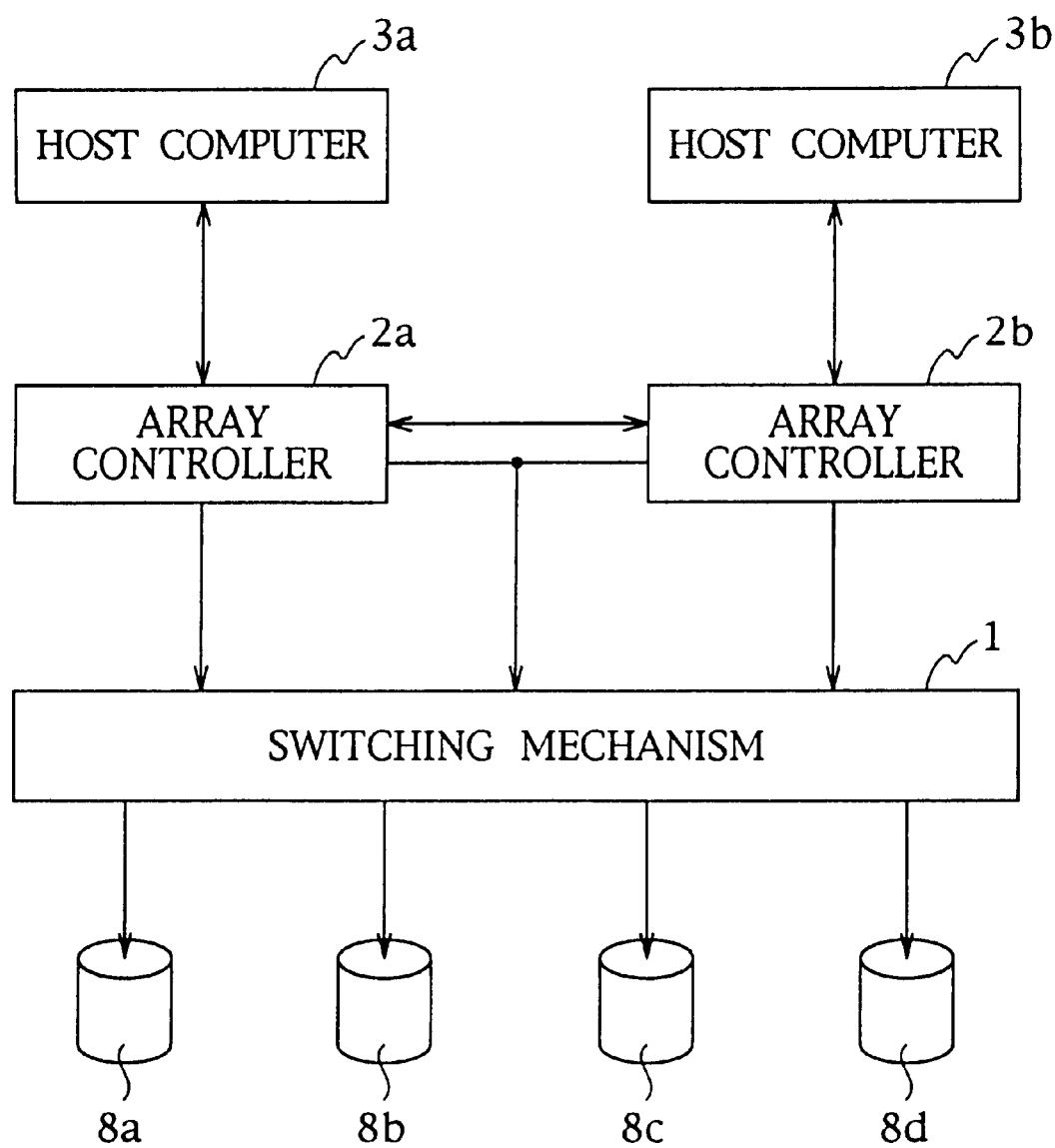
FIG. 9 is a block diagram showing a configuration of a computer system using a plurality of host computers.

In a computer system constituting a disk array, various countermeasures are taken so as to increase the reliability according to a purpose of the user. For example, FIG. 9 shows a computer system having two host computers, one of which is set as a wait system. Even if an error has occurred in the host computer, control is immediately switched to the wait system, so that a data already accumulated can be utilized. In this case, if each of the array controllers 2 is connected to the corresponding host computer, the array controller 2 should be switched. Accordingly, when switching is performed by communication between the array controllers 2 or by communication between the host computers, a path switching signal is transmitted to the switching mechanism 1.

As has been described above, in the present embodiment, it is possible to use a magnetic disk apparatus of ATA specification which is cheap in cost, thus enabling to reduce the cost of the disk array apparatus itself. Furthermore, the cost can also be reduced because there is no need of providing an expensive SCSI controller on the control package. Moreover, because the switching mechanism is used, it is possible to use a plurality of array controllers for improving the reliability as a disk array apparatus even when utilizing a magnetic disk apparatus of ATA specification.

The present invention has the aforementioned configuration and functions as has been described above. When a path switching signal is received by a switch circuit, one of the array controller connectors is connected to the disk apparatus connector. Accordingly, even if the disk apparatus has a specification for recognizing only one initiator (array controller) such as an ATA disk, it is possible to use a plurality of array controllers which are switched from one to another. This enables to realize a disk array using comparatively cheap disk apparatuses with a plurality array controllers, enabling to improve the reliability. Furthermore, the switch circuit switches connection lines, so that an array controller is directly connected to a disk apparatus during a data transfer. This enables to perform a data transfer at a high speed. Moreover, the switch circuit switches connections between disk apparatuses according to a path switching signal supplied from an array controller. Accordingly, when a SCSI command from a host computer is received by the array controller, the command can be modified, for example, into an ATA command and a path switching signal thereby to control the disk apparatus and the switching mechanism. Thus, it is possible to provide a switching mechanism and a disk array system capable of utilizing host computer resources for SCSI conventionally used widely as well as using a plurality of array controllers thereby to improve the reliability.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-047384 (Filed on Feb. 27, 1998) including specification, claims, drawings and summary are incorporated herein by reference in its entirety.

What is claimed is:

1. A switching mechanism for switching between disk apparatuses in a disk array system, said mechanism comprising:

a plurality of array controller connectors connected to a first signal line for a data transfer to/from a plurality of array controllers;

a plurality of disk apparatus connectors connected to a second signal line for a data transfer to/from a disk apparatus in which writing/reading of said data is controlled by said array controllers, said disk apparatus being unable to recognize more than one array controller at a time;

a plurality of connection lines for connections between said plurality of array controller connectors and said disk apparatus connectors;

a plurality of switch circuits provided on said connection lines for one-to-one connection between said plurality of array controller connectors and said disk apparatus connectors; and an array controller switching circuit provided in said switch circuits and upon reception of a path switching signal from said array controllers, establishing a connection between an array controller corresponding to said path switching signal and said disk apparatus connectors.

2. A switching mechanism as claimed in claim 1, wherein each of said plurality of switch circuits is connected independently from one another to said disk apparatuses.

3. A switching mechanism as claimed in claim 1, said mechanism further comprising a control line connector for connecting a control line for transmitting said path switching signal, to said switch circuits.

4. A switching mechanism as claimed in claim 1, wherein said switch circuits provide a first operation state for connecting a first one of said array controllers to said disk apparatuses and a second operation state for connecting a second one of said array controllers to said disk apparatuses.

5. A switching mechanism as claimed in claim 1, wherein said switch circuits provide a first operation state for connecting a first one of said array controllers to said disk apparatuses, a second operation state for connecting a second one of said array controllers to said disk apparatuses, and a third operation state for not connecting any one of said first and second array controllers to said disk apparatuses.

6. A switching mechanism for switching between disk apparatuses in a disk array system, said mechanism comprising:

a plurality of array controller connectors connected to a first signal line for a data transfer to/from a plurality of array controllers;

a plurality of disk apparatus connectors connected to a second signal line for a data transfer to/from a disk apparatus in which writing/reading of said data is controlled by said array controllers, said disk apparatus recognizing no more than one array controller at a time;

a plurality of connection lines for connections between said plurality of array controller connectors and said disk apparatus connectors;

a plurality of switch devices provided on said connection lines for one-to-one connection between said plurality of array controller connectors and said disk apparatus connectors; and an array controller switching device provided in said switch devices and upon reception of a path switching signal from said array controllers, establishing a connection between an array controller corresponding to said path switching signal and said disk apparatus connectors.

7. A disk array apparatus comprising:

a plurality of switching mechanisms, each having an array controller connector;

a plurality of disk apparatuses which are connected to said switch mechanisms on a one-to-one basis; and a plurality of array controllers connected to said array controller connectors and in response to an instruction from a host computer, writing/reading a data to/from said disk apparatuses, wherein each of said switching mechanisms includes:

a plurality of array controller connectors connected to a first signal line for a data transfer to/from a plurality of array controllers;

a plurality of disk apparatus connectors connected to a second signal line for a data transfer to/from a disk apparatus in which writing/reading of said data is controlled by said array controllers, said disk apparatus recognizing no more than one array controller at a time;

a plurality of connection lines for connections between said plurality of array controller connectors and said disk apparatus connectors;

a plurality of switch circuits provided on said connection lines for one-to-one connection between said plurality of array controller connectors and said disk apparatus connectors; and an array controller switching circuit provided in said switch circuits and upon reception of a path switching signal from said array controllers, establishing a connection between an array controller corresponding to said path switching signal and said disk apparatus connectors, wherein said array controllers, upon reception of a control authority of one of said disk apparatuses, outputs a path switching signal to one of said switching mechanisms corresponding to said disk apparatus.

8. A disk array apparatus as claimed in claim 7, wherein said array controller which has acquired the control authority outputs said path switching signal to each of said plurality of switching mechanisms.

9. A disk array apparatus as claimed in claim 7, wherein said array controller which has acquired the control authority outputs signals identical to said path switching signal at once to said plurality of switching mechanisms.

10. A disk array apparatus as claimed in claim 7, wherein said plurality of disk apparatuses have an interface allowing only a single initiator.

11. A disk array apparatus as claimed in claim 7, wherein said plurality of disk apparatuses comprises magnetic disk apparatuses of the Advanced Technology Attachment specification.

12. A disk array apparatus comprising:

a plurality of array controllers for controlling a data writing/reading to/from disk apparatuses according to an instruction from a host computer;

a plurality of disk apparatuses for writing/reading said data according to control by said array controllers; and a switching mechanism connected to each of said plurality of disk apparatuses for exclusively switching between said plurality of array controllers and said disk apparatuses, wherein said array controllers, upon reception of a control authority of a disk apparatus according to an instruction from a host computer, controls a switch mechanism corresponding to said disk apparatus for connection between said array controller and said disk apparatus, said disk apparatus recognizing no more than one array controller at a time.

13. A disk array apparatus as claimed in claim 12, said apparatus further comprising a communication line for connection between said array controllers, so that said array controllers perform a processing for acquiring said disk control authority through said communication line.

14. A disk array apparatus as claimed in claim 12, wherein said array controllers cause said disk array apparatuses to:

acquire said disk control authority;

control said switching mechanism for switching the connection between said array controllers and said disk apparatuses;

output a command to said switched disk apparatus; and decide that said switching mechanism or disk apparatus has failed if no response is obtained for said command.

15. A disk array apparatus as claimed in claim 14, wherein said failure decision is performed using means for repeatedly transmitting said command and means for deciding that said switching mechanism or disk apparatus has failed if no response is obtained for said command transmitted repeatedly.

16. A disk array apparatus as claimed in claim 14, wherein said failure decision is performed by using means for counting a time after transmission of said command and means for deciding that said switching mechanism or disk apparatus has failed if no response is received in a predetermined time after the transmission of said command.

17. A computer system comprising:

a host computer;

a plurality of disk apparatuses for writing and reading a data;

a plurality of array controllers for controlling a data writing/reading to/from said disk apparatuses according to an instruction from said host computer, said disk apparatus recognizing no more than one array controller at a time;

a switching mechanism connected to each of said disk apparatuses and exclusively switching one of said plurality of array controllers to said disk apparatuses; and an array controller switching circuit provided in said host computer and serving in such a way that when one of said array controllers has failed, control is passed to another array controller, said array controllers causing said computer system to:
acquire a control authority of said disk apparatuses when switched by said array controller switching circuit.

18. A computer system comprising:

a host computer;

a plurality of disk apparatuses for writing and reading a data;

a plurality of array controllers for controlling a data writing/reading to/from said disk apparatuses according to an instruction from said host computer, said disk apparatus recognizing no more than one array controller at a time;

a switching mechanism connected to each of said disk apparatuses and exclusively switching one of said plurality of array controllers to said disk apparatuses; and an array controller switching circuit provided in said host computer and serving in such a way that when one of said array controllers has failed, control is passed to another array controller, each of said array controllers including:
a unit for acquiring a control authority of said disk apparatuses when switched by said array controller switching circuit; and a control unit for controlling said switching mechanism so as to connect said array controller to said disk apparatuses.

* * * * *